Patented Aug. 22, 1939

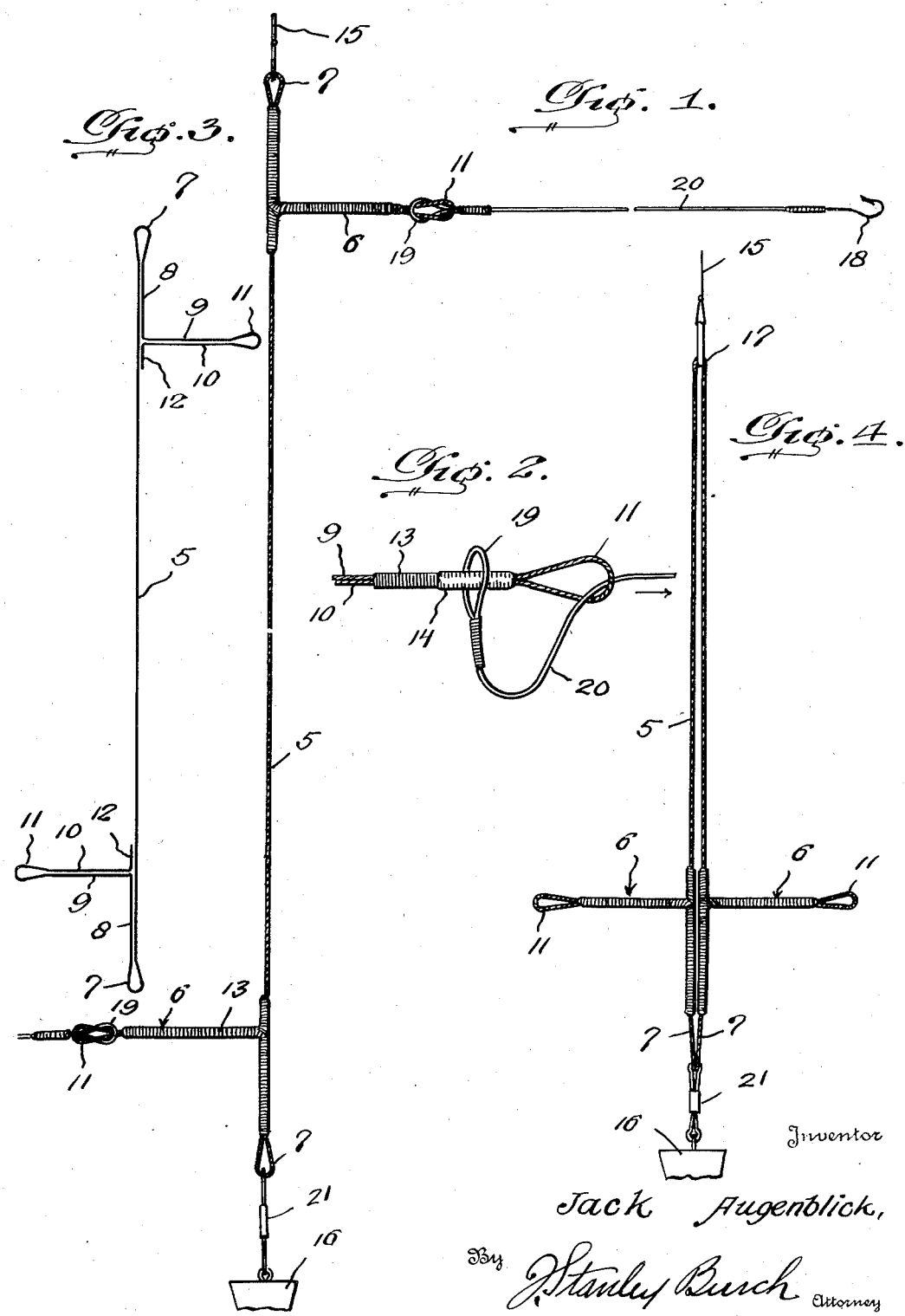

2,170,788

UNITED STATES PATENT OFFICE 2,170,788

FISHING LINE LEADER

Jack Augenblick, Atlantic City, N. J., assignor to Sports Equipment Mfg. Corp., a corporation of New Jersey Application May 9, 1938, Serial No. 206,896

1 Claim. (Cl. 43—28)

This invention relates to an improved fishing line leader of that type which is formed of non-rustable pliable material such as gut or twisted brass wire, and which is provided with means to maintain hooks in outstanding relation to the main strand of the leader to most effectively attract fish and to prevent entanglement of the hook and its snell with the main strand of the leader.

Another object is to provide a leader of the above kind which may be folded into compact form when not in use, and which may be effectively used either when completely unfolded and extended to full length or when folded centrally between its ends.

A still further object of the present invention is to provide a leader of the above kind which is extremely simple in construction, economical to manufacture, and durable and efficient in use.

The present invention consists in the novel form, combination and arrangement of parts hereinafter more fully described, shown in the accompanying drawing and claimed.

In the drawing:

Figure 1 is an elevation of my improved leader, partly broken away.

Figure 2 is an enlarged fragmentary view illustrating the manner of connecting the hook snell to the arms extending laterally from the main strand of the leader.

Figure 3 is an elevation of the gut or wire member as it appears after being bent or formed into the desired shape, preparatory to constructing the completed leader of Figure 1, this figure being on a reduced scale; and Figure 4 is a view of the leader shown in Figure 3 centrally return-bent intermediate its ends when desired to be used in this way.

Referring in detail to the drawing, the present leader is formed from a single length of non-rustable pliable material such as gut or twisted brass wire, fashioned into a main strand or line 5 and arms 6 extending laterally from the main strand or line 5 near the ends of the latter. More particularly, the single length of gut or wire is return-bent near its ends to provide end loops 7 and short strands 8 contacting the main strand or line 5, the end portions of the length of material being then bent laterally and return-bent to provide the arms 6 composed of two contiguous strands 9 and 10 and formed at their outer ends with elongated loops 11. Also, the end portions of the length of material have terminal ends 12 which are disposed parallel with and contiguous to the main strand or line 5 at the juncture of the arms 6 therewith. These contiguous strands 5, 8, 9, 10 and 12 are suitably secured together, such as gluing, soldering, or wrapping them as generally indicated at 13. When the strands are secured together by wrapping, the wrapping material, such as silk, is preferably coated with waterproof cement as indicated more clearly at 14 in Figure 2.

It will be seen that the end loops 7 provide for ready attachment of the fishing line 15 to one end of the leader and the sinker 16 to the other end of the leader when the device is used in completely unfolded condition and extended to full length as shown in Figure 1. However, under certain conditions, it may be preferred to fold the leader centrally between its ends as shown in Figure 4 so that the arms 6 are disposed in opposed relation near the bottom of the device, the sinker 16 being connected to the adjacent loops 7, and the line 15 being connected to the main strand or line 5 of the leader where it is folded at 17.

The loops 11 of the arms 6 are made of elongated form and of such size as to permit passage of the hooks 18 therethrough after the loops 19 of the snells 20 of said hooks are passed over the loops 11 as illustrated in Figure 2. Thus, when the snells 20 are pulled outwardly, the loops 19 thereof are disposed so as to hold the hooks and snells in an outwardly extending substantially horizontal position, the snells being sufficiently stiff to extend in this way and being held in such position due to the interlocking relation of the associated loops 11 and 19 and the elongated form of the loops 11. Thus, the hooks are maintained in position most effective to attract attention of fish and to prevent the usual entanglement of the hooks and snells with the main strand or line of the leader. Any suitable form of coupling 21 may be employed for connecting the sinker 16 with the leader.

It will be noted that the present device is extremely simple and may be conveniently and economically manufactured. At the same time, a leader is provided which is unusually durable as well as efficient in use.

What I claim as new is:

A fishing line leader formed from a single length of non-rustable pliable material fashioned into a main strand and arms extending laterally from said main strand near the ends of the latter, said single length of material being return-bent near its ends to provide end loops and adjacent contiguous strands, and the end portions of said length of material being extended laterally and return-bent to form the arms with loops at their outer ends and of contiguous strands, and means securing said contiguous strands together and to the main strand of the leader.

JACK AUGENBLICK.